United States Patent
Kim et al.

(10) Patent No.: US 10,990,234 B2
(45) Date of Patent: Apr. 27, 2021

(54) TOUCH SENSOR INCLUDING ANTENNA

(71) Applicant: DONGWOO FINE-CHEM CO., LTD., Iksan-si (KR)

(72) Inventors: Jong Min Kim, Pyeongtaek-si (KR); Dong Pil Park, Incheon (KR); Byung Jin Choi, Incheon (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 0 days.

(21) Appl. No.: 16/490,087

(22) PCT Filed: Nov. 21, 2017

(86) PCT No.: PCT/KR2017/013215
§ 371 (c)(1),
(2) Date: Aug. 30, 2019

(87) PCT Pub. No.: WO2018/159926
PCT Pub. Date: Sep. 7, 2018

(65) Prior Publication Data
US 2020/0067176 A1    Feb. 27, 2020

(30) Foreign Application Priority Data
Mar. 3, 2017  (KR) .................. 10-2017-0027810

(51) Int. Cl.
*H01Q 1/38* (2006.01)
*G06F 3/041* (2006.01)
(Continued)

(52) U.S. Cl.
CPC ........ *G06F 3/0446* (2019.05); *G06F 3/04182* (2019.05); *H01Q 1/243* (2013.01);
(Continued)

(58) Field of Classification Search
CPC .... H01Q 1/22; H01Q 1/24; H01Q 1/241–243; H01Q 1/38; H01Q 1/44;
(Continued)

(56) References Cited

U.S. PATENT DOCUMENTS

| 2004/0183788 A1* | 9/2004 | Kurashima | ............. G06F 3/045 345/173 |
| 2009/0167699 A1* | 7/2009 | Rosenblatt | ....... G06K 19/07749 345/173 |

(Continued)

FOREIGN PATENT DOCUMENTS

| KR | 2016-0050467 A | 5/1916 |
| KR | 2008-0002909 A | 1/2008 |

(Continued)

*Primary Examiner* — Jason Crawford
(74) *Attorney, Agent, or Firm* — DLA Piper LLP (US)

(57) ABSTRACT

The present invention relates to a touch sensor having an antenna. The touch sensor comprises: a touch sensor part including a sensing electrode part; and an antenna part formed on the touch sensor part. The antenna part is formed in a state of being insulated from the sensing electrode part on the sensing electrode part composing the touch sensor part. According to the present invention, even when mounting the antenna on a display region in which a touch sensor is installed, noise due to interference between a touch sensor signal and an antenna transmission/reception signal can be minimized.

13 Claims, 8 Drawing Sheets

(51) Int. Cl.
  *G06F 3/044* (2006.01)
  *H01Q 1/24* (2006.01)
(52) U.S. Cl.
  CPC ............. *H01Q 1/38* (2013.01); *G06F 3/0443* (2019.05); *G06F 2203/04111* (2013.01)
(58) Field of Classification Search
  CPC . H01Q 1/52; G06F 3/044; G06F 2203/04107; G06F 2203/04111; G06F 2203/04112
  See application file for complete search history.

(56) References Cited

U.S. PATENT DOCUMENTS

| | | | | |
|---|---|---|---|---|
| 2010/0013745 | A1* | 1/2010 | Kim | H01L 27/3244 345/76 |
| 2011/0273382 | A1 | 11/2011 | Yoo et al. | |
| 2012/0329524 | A1* | 12/2012 | Kent | H01Q 1/243 455/566 |
| 2014/0028619 | A1* | 1/2014 | Huang | G06F 3/0412 345/174 |
| 2015/0185928 | A1* | 7/2015 | Son | G06F 3/04166 345/174 |
| 2015/0193080 | A1* | 7/2015 | Takahashi | G06F 3/03547 345/174 |
| 2016/0093943 | A1* | 3/2016 | Yang | H01Q 7/00 343/702 |
| 2016/0126614 | A1* | 5/2016 | Lim | H01Q 1/243 343/720 |
| 2016/0132281 | A1* | 5/2016 | Yamazaki | G06F 3/0446 345/1.3 |
| 2016/0179259 | A1* | 6/2016 | Watanabe | G06F 3/0412 345/174 |
| 2016/0188092 | A1* | 6/2016 | Sebastian | G06F 3/045 345/174 |
| 2016/0328057 | A1* | 11/2016 | Chai | H01Q 1/243 |
| 2017/0083153 | A1* | 3/2017 | Yeh | G06F 3/041 |
| 2017/0139520 | A1* | 5/2017 | Yeh | H01Q 1/2258 |
| 2017/0205919 | A1* | 7/2017 | Shibata | G06F 3/0445 |
| 2017/0237152 | A1* | 8/2017 | Lee | H01Q 5/371 343/702 |
| 2018/0059869 | A1* | 3/2018 | Ma | G06F 3/0445 |
| 2018/0314369 | A1* | 11/2018 | Yashiro | H01Q 1/243 |
| 2019/0036208 | A1* | 1/2019 | Yamagishi | G06K 19/0723 |
| 2019/0220123 | A1* | 7/2019 | Kanaya | G06F 3/0443 |
| 2019/0346987 | A1* | 11/2019 | Shi | G06F 3/0416 |
| 2020/0201470 | A1* | 6/2020 | Oh | G06F 3/0412 |
| 2020/0227819 | A1* | 7/2020 | Oh | H01Q 9/0421 |

FOREIGN PATENT DOCUMENTS

| | | |
|---|---|---|
| KR | 2012-0036658 A | 4/2012 |
| KR | 2014-0100822 A | 8/2014 |
| KR | 2015/0086947 A | 7/2015 |

\* cited by examiner

TOUCH SENSOR INCLUDING ANTENNA

TECHNICAL FIELD

The present invention relates to an antenna-equipped touch sensor, and more particularly, to an antenna-equipped touch sensor capable of minimizing noise due to interference between a touch sensor signal and an antenna transmission/reception signal even when an antenna is mounted in a display region where the touch sensor is installed.

BACKGROUND ART

A touch sensor is an input device for selecting an instruction displayed on a screen of an image display apparatus or the like with a human hand or an object to allow a user's command to be input.

To this end, a touch sensor is provided on a front face of an image display apparatus to detect a contact location that is in direct contact with a human hand or an object and convert the contact into an electrical signal. Thus, an instruction selected in the contact location is received as an input signal.

Since such a touch sensor can replace a separate input device connected to an image display apparatus and configured to operate, such as a keyboard and a mouse, the use range thereof is gradually expanding. As an example, a touch sensor may be coupled to an image display apparatus employed for a cell phone, a navigation device or the like and then may be utilized as an input device.

Meanwhile, a terminal such as a cell phone or a navigation device should be equipped with an antenna for short- and/or long-range wireless communication. Generally, such an antenna is provided separately from an image display apparatus or a touch sensor. This causes an increase in complexity of an internal structure of the terminal, an increase in manufacturing cost, and an increase in thickness of the terminal.

Also, when an antenna is installed near a touch sensor, signal interference may occur therebetween, thus degrading the performance of the antenna and the touch sensor.

In detail, as a bezel region of an electronic device such as a cell phone decreases in order to maximize a screen region thereof, a space for installing an antenna also decreases, and thus there is an increasing need for the antenna to be mounted in a display region where a touch sensor is installed. However, when the antenna is mounted in the display region, noise may be caused by interference between a touch sensor signal and an antenna transmission/reception signal.

PRIOR ART DOCUMENT

Patent Document (Patent Document 1) Korea Patent Publication No. 10-2014-0100822 (published on Aug. 18, 2014, entitled "Touch Screen Panel Having Antenna Pattern and Display Device Having the Same")

SUMMARY OF INVENTION

Technical Problem

A technical object of the present invention is to provide an antenna-equipped touch sensor capable of minimizing noise due to interference between a touch sensor signal and an antenna transmission/reception signal even when an antenna is mounted in a display region where the touch sensor is installed.

Solution to Problem

In order to achieve the technical object, an antenna-equipped touch sensor according to the present invention includes a touch sensor unit including a sensing electrode unit and an antenna unit formed on the touch sensor unit, wherein the antenna unit is formed on the sensing electrode unit included in the touch sensor unit while being insulated from the sensing electrode unit.

The antenna-equipped touch sensor according to the present invention is characterized in that the antenna unit includes a signal radiation pattern unit and a signal transmission line unit.

The antenna-equipped touch sensor according to the present invention is characterized in that the signal radiation pattern unit is located in a region defined by a unit electrode pattern included in the sensing electrode unit.

The antenna-equipped touch sensor according to the present invention is characterized in that the sensing electrode unit includes a transmitting (Tx) electrode unit and a receiving (Rx) electrode unit that are formed to cross each other while being insulated from each other.

The antenna-equipped touch sensor according to the present invention is characterized in that the antenna unit is formed on the Tx electrode unit or the Rx electrode unit while being insulated from the Tx electrode unit and the Rx electrode unit.

The antenna-equipped touch sensor according to the present invention is characterized in that the sensing electrode unit further includes a first insulating unit configured to insulate the Rx electrode unit and the Tx electrode unit and a bridge pattern unit configured to connect divisions of the Tx electrode unit, which have been separated from each other in the crossing region, and the antenna unit is formed on the Tx electrode unit or the Rx electrode unit while being insulated by the first insulating unit.

The antenna-equipped touch sensor according to the present invention is characterized in that the antenna unit has a mesh structure or a front metal thin-film structure.

The antenna-equipped touch sensor according to the present invention is characterized in that the antenna unit contains a conductive oxide.

The antenna-equipped touch sensor according to the present invention is characterized in that the bridge pattern unit is formed with first through-holes formed in the first insulating unit, formed on the first insulating unit, and configured to connect, through the first through-holes, the divisions of the Tx electrode unit, which have been separated from each other in the crossing region, and the antenna unit is formed on the Tx electrode unit or the Rx electrode unit via the first insulating unit.

The antenna-equipped touch sensor according to the present invention is characterized in that the antenna unit is bonded to the touch sensor unit.

The antenna-equipped touch sensor according to the present invention is characterized in that the sensing electrode unit includes an Rx electrode unit formed on a substrate to extend in one direction, a Tx electrode unit formed to have divisions separated from each other in a region crossing the Rx electrode unit, a first insulating unit formed to cover the Rx electrode unit and the Tx electrode unit and configured to insulate the Rx electrode unit and the Tx electrode unit, and a bridge pattern unit formed with first through-holes formed in the first insulating unit, formed on the first insulating unit between the first through-holes, and configured to connect, through the first through-holes, the divisions of the Tx electrode unit separated from each other in the crossing region, and the antenna unit is bonded to the touch sensor unit.

The antenna-equipped touch sensor according to the present invention is characterized in that the sensing electrode unit includes an Rx electrode unit formed on a substrate to extend in one direction, a Tx electrode unit formed to have divisions separated from each other in a region crossing the Rx electrode unit, a first insulating unit formed to cover the Rx electrode unit and the Tx electrode unit and configured to insulate the Rx electrode unit and the Tx electrode unit, and a bridge pattern unit formed with first through-holes formed in the first insulating unit, formed on the first insulating unit between the first through-holes, and configured to connect, through the first through-holes, the divisions of the Tx electrode unit separated from each other in the crossing region, and the antenna unit includes a signal radiation pattern unit formed on the Tx electrode unit or the Rx electrode unit via the first insulating unit, a second insulating unit formed to cover the signal radiation pattern unit and the bridge pattern unit and configured to insulate the signal radiation pattern unit and the bridge pattern unit, and a signal transmission line unit formed with second through-holes formed in the second insulating unit, formed on the second insulating unit between the second through-holes, and configured to connect the signal radiation pattern unit.

The antenna-equipped touch sensor according to the present invention is characterized in that the antenna-equipped touch sensor further includes a protective unit formed to cover the signal transmission line unit and the second insulating unit.

The antenna-equipped touch sensor according to the present invention is characterized in that the sensing electrode unit includes an Rx electrode unit formed on a substrate to extend in one direction, a Tx electrode unit formed to have divisions separated from each other in a region crossing the Rx electrode unit, a first insulating unit formed to cover the Rx electrode unit and the Tx electrode unit and configured to insulate the Rx electrode unit and the Tx electrode unit, and a bridge pattern unit formed with first through-holes formed in the first insulating unit, formed on the first insulating unit, and configured to connect, through the first through-holes, the divisions of the Tx electrode unit separated from each other in the crossing region, and while a third insulating unit is formed on the sensing electrode unit, the antenna unit is formed on the Tx electrode unit or the Rx electrode unit via the third insulating unit.

Advantageous Effects of Invention

According to the present invention, it is possible to provide an antenna-equipped touch sensor capable of minimizing noise due to interference between a touch sensor signal and an antenna transmission/reception signal even when an antenna is mounted in a display region where the touch sensor is installed.

DETAILED DESCRIPTION OF EMBODIMENT

As specific structural or functional descriptions for the embodiments according to the concept of the invention disclosed herein are merely exemplified for purposes of describing the embodiments according to the concept of the invention, the embodiments according to the concept of the invention may be embodied in various forms and are not limited to the embodiments described herein.

While the embodiments of the present invention are susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element without departing from the scope of the present invention.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components, or groups thereof, but do not preclude the presence or addition of one or more other features, integers, steps, operations, elements, components, and/or groups thereof.

Unless otherwise defined, all terms (including technical or scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present invention will be described in detail with reference to the accompanying drawings.

Figure 1:
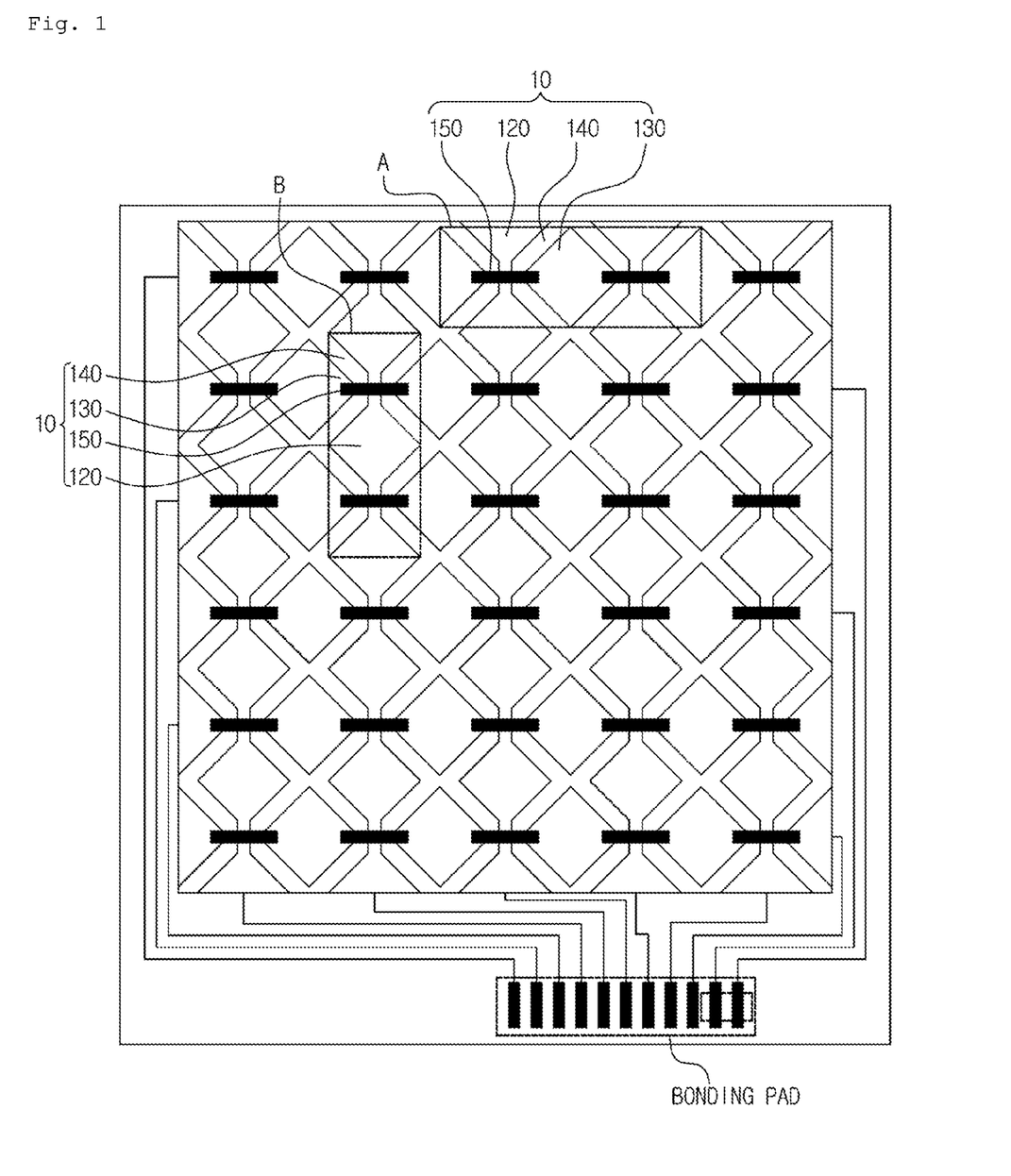
FIG. 1 is a diagram illustrating a conceptual planar shape of a touch sensor applicable to an antenna-equipped touch sensor according to an embodiment of the present invention.

FIG. 1 is a plan view of an antenna-equipped touch sensor according to an embodiment of the present invention.

Referring to FIG. 1, the touch sensor according to an embodiment of the present invention may have a display region and a non-display region on the basis of whether visual information is displayed.

The display region is a region for displaying a picture provided by an apparatus coupled to the touch sensor and also sensing a touch signal input from a user in a capacitive manner. In the display region, a touch sensor unit 10 including a transmitting (Tx) electrode unit 130 and a receiving (Rx) electrode unit 120, which are multiple sensing patterns formed in crossing directions, is provided. As will be described in detail later, for example, a sensing electrode unit 110 included in the touch sensor unit 10 includes the Tx electrode unit 130 and the Rx electrode unit 120 that are formed to cross each other while being insulated from each other, and an antenna unit 20 may be formed 1) on the Tx electrode unit 130 while being insulated from the Tx electrode unit 130 and the Rx electrode unit 120, 2) on the Rx electrode unit 120 while being insulated from the Tx electrode unit 130 and the Rx electrode unit 120, or 3) by overlapping with both of the Tx electrode unit 130 and the Rx electrode unit 120 while being insulated from the Tx electrode unit 130 and the Rx electrode unit 120.

For example, the antenna unit 20 may include a signal radiation pattern unit and a signal transmission line unit. In order to minimize noise due to interference between a touch sensor signal and an antenna transmission/reception signal, the signal radiation pattern unit may be located in a region defined by a unit electrode pattern included in the sensing electrode unit 110.

A connection line electrically connected to the touch sensor unit 10 and a bonding pad electrically connected to the connection line are formed in the non-display region, which is located around the display region. A flexible printed circuit (FPC) for transferring a touch signal sensed in the display region to a driving unit (not shown) is connected to the bonding pad.

Figure 2:
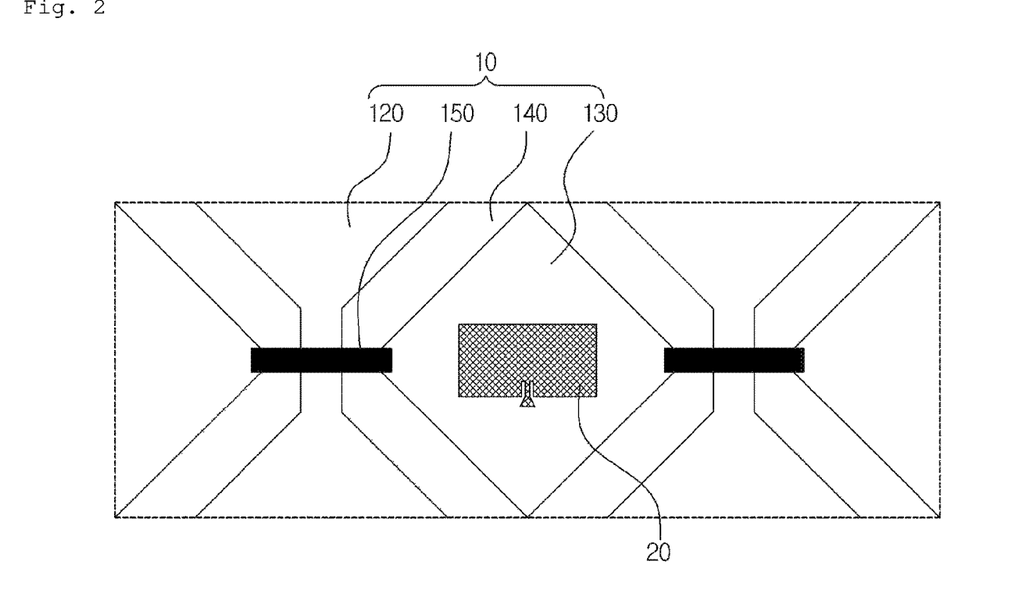
FIGS. 2 to 4 are diagrams illustrating a planar shape in which an antenna unit is formed on a sensing electrode unit included in a touch sensor unit according to an embodiment of the present invention.
Figure 3:
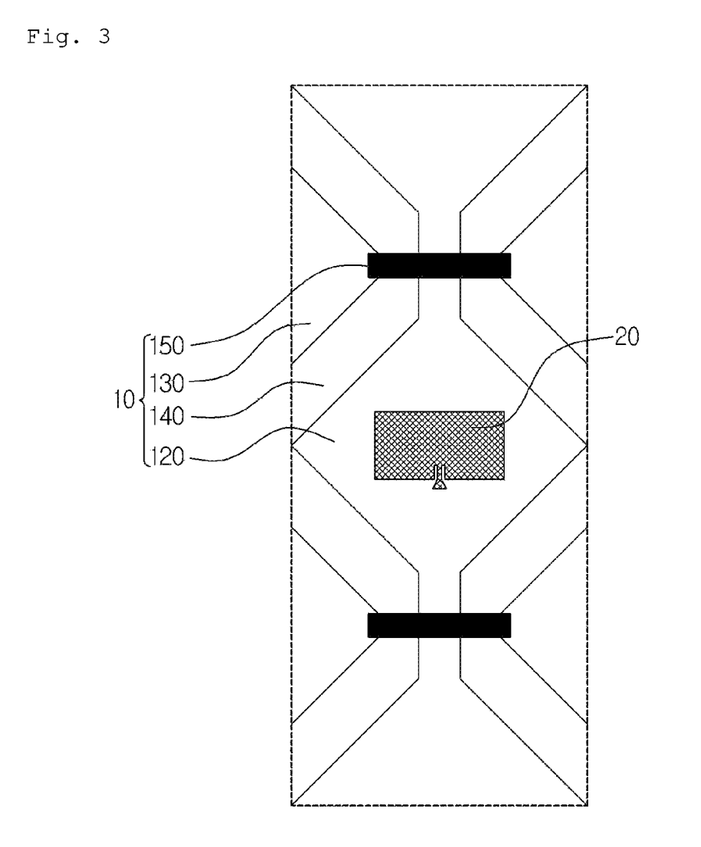
Figure 4:
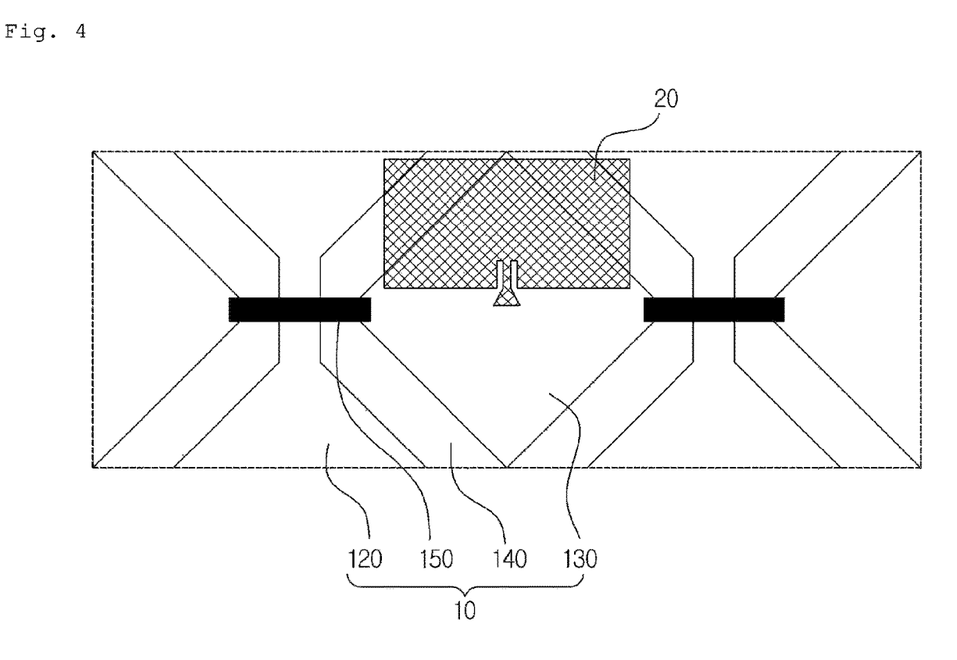

Although not shown in FIG. 1, the antenna unit 20 for transmitting and receiving radio signals is provided on the touch sensor unit 10 for the purpose of wireless communication with the outside. In FIGS. 2 to 4, a planar shape in which the antenna unit 20 is formed on the sensing electrode unit 110 included in the touch sensor unit 10 is shown as an example. FIG. 2 shows an example in which the antenna unit 20 is formed on the Tx electrode unit 130 while being insulated from the Tx electrode unit 130 and the Rx electrode unit 120, FIG. 3 shows an example in which the antenna unit 20 is formed on the Rx electrode unit 120 while being insulated from the Tx electrode unit 130 and the Rx electrode unit 120, and FIG. 4 shows an example in which the antenna unit 20 is overlapped on both of the Tx electrode unit 130 and the Rx electrode unit 120 while being insulated from the Tx electrode unit 130 and the Rx electrode unit 120.

Figure 5A:
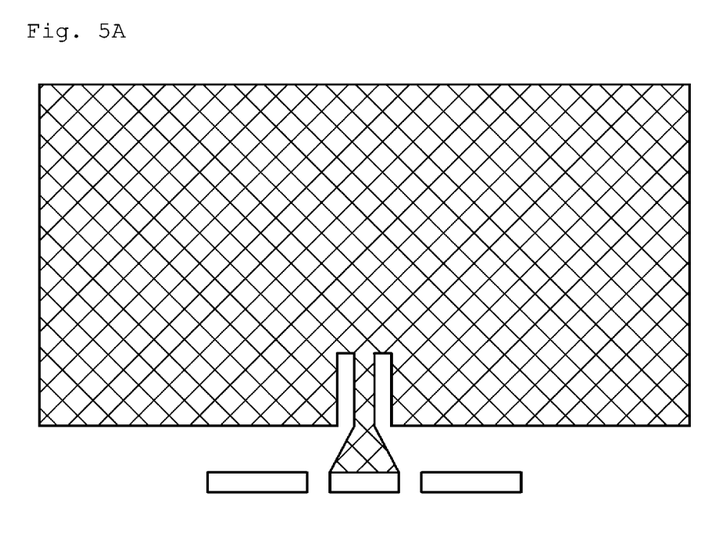
FIG. 5A and FIG. 5B are diagrams illustrating a planar shape of an antenna applicable to an antenna-equipped touch sensor according to an embodiment of the present invention.
Figure 5B:
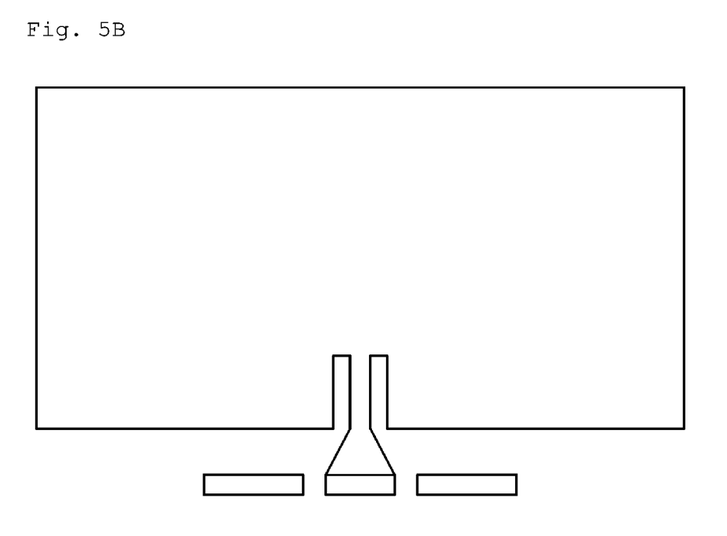

FIG. 5A and FIG. 5B illustrate planar shapes of an antenna applicable to an antenna-equipped touch sensor according to an embodiment of the present invention. In particular, FIG. 5A shows an example in which at least a signal radiation pattern among the elements of the antenna unit 20 is produced in a metal mesh form. As disclosed in FIG. 5B, the antenna unit 20 may be produced in a typical metal thin-film form. For example, the antenna unit 20 may contain a conductive oxide. In detail, a well-known transparent conductive oxide, including indium tin oxide (ITO) and indium zinc oxide (IZO), may be applied to the antenna unit 20.

Figure 6:
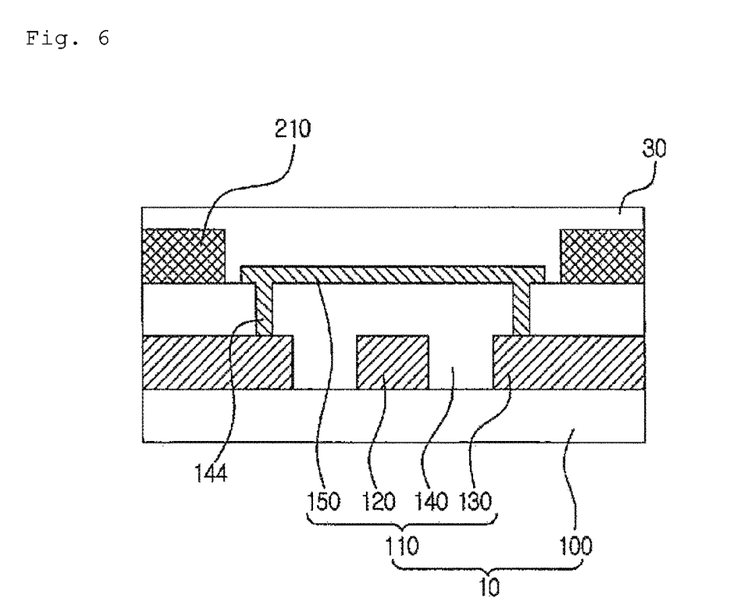
FIGS. 6 to 8 are example sectional views of an antenna-equipped touch sensor according to an embodiment of the present invention.
Figure 7:
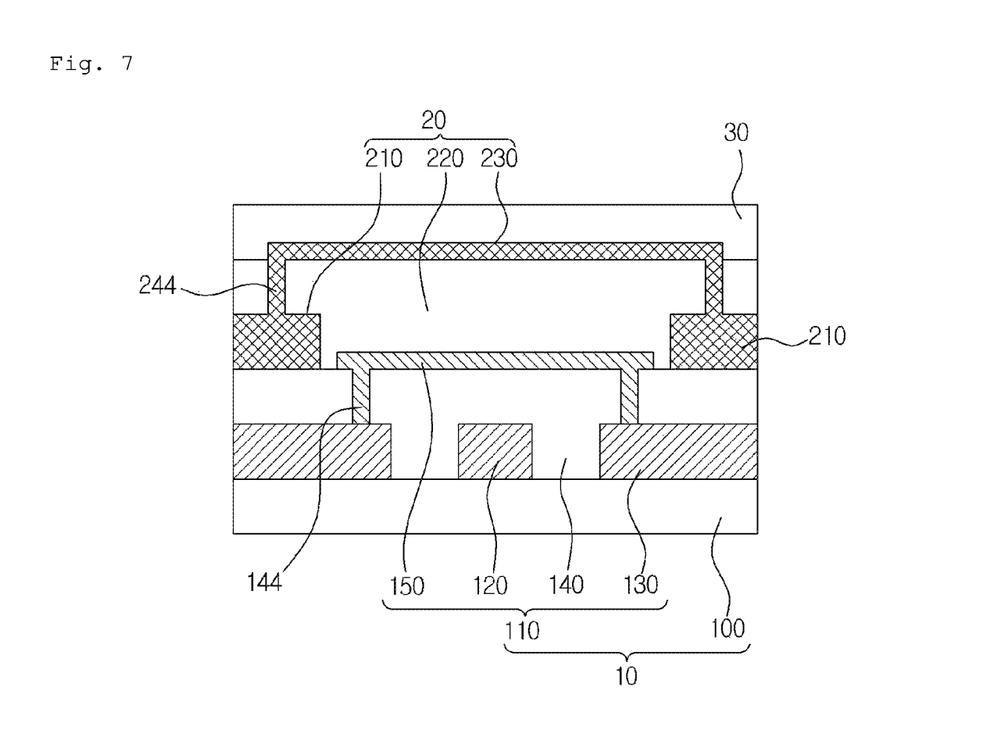
Figure 8:
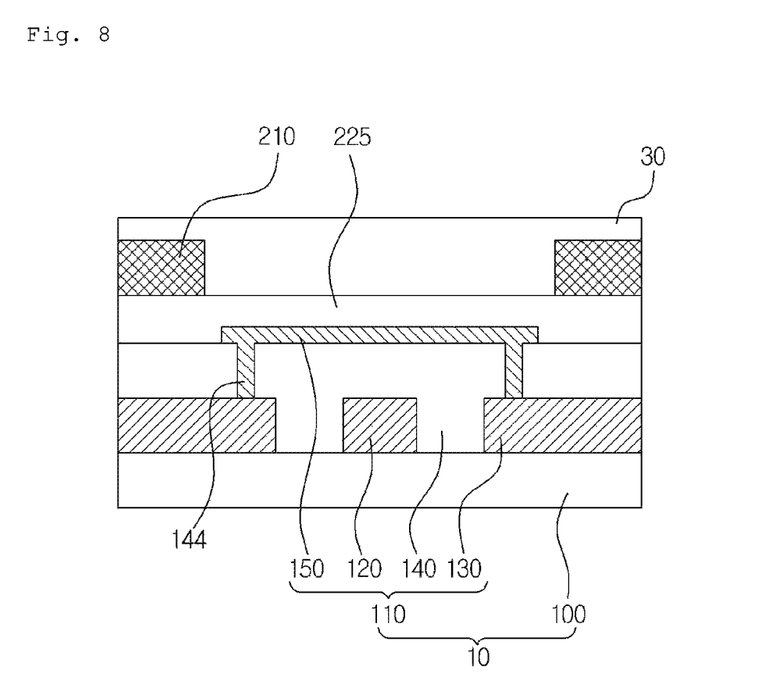

FIGS. 6 to 8 are example sectional views of the antenna-equipped touch sensor according to an embodiment of the present invention.

Referring to FIGS. 6 to 8, the antenna-equipped touch sensor according to an embodiment of the present invention includes the touch sensor unit 10 including the sensing electrode unit 110 and the antenna unit 20 formed on the touch sensor unit 10. The antenna unit 20 is formed on the sensing electrode unit 110 included in the touch sensor unit 10 while being insulated from the sensing electrode unit 110.

According to an embodiment of the present invention, various examples in which the antenna unit 20 is mounted on the touch sensor unit 10 will be described as follows.

As one example, a sensing electrode unit 110 included in a touch sensor unit 10 may include a Tx electrode unit 130 and an Rx electrode unit 120 that are formed to cross each other while being insulated from each other, and an antenna unit 20 may be formed 1) on the Tx electrode unit 130 while being insulated from the Tx electrode unit 130 and the Rx electrode unit 120 or 2) on the Rx electrode unit 120 while being insulated from the Tx electrode unit 130 and the Rx electrode unit 120.

As another example, a sensing electrode unit 110 included in a touch sensor unit 10 may include an Rx electrode unit 120 formed on a substrate 100 to extend in one direction, a Tx electrode unit 130 formed to have divisions separated from each other in a region crossing the Rx electrode unit 120, a first insulating unit 140 configured to insulate the Rx electrode unit 120 and the Tx electrode unit 130, and a bridge pattern unit 150 configured to connect the divisions of the Tx electrode unit 130, which have been separated from each other in the crossing region. Here, an antenna unit 20 may be formed on the Tx electrode unit 130 or the Rx electrode unit 120 while being insulated from the Rx electrode unit 120, the Tx electrode unit 130, and the bridge pattern unit 150 included in the touch sensor unit 10 by the first insulating unit 140.

As still another example, as disclosed in FIG. 6, a sensing electrode unit 110 included in a touch sensor unit 10 may include an Rx electrode unit 120 formed on a substrate 100 to extend in one direction, a Tx electrode unit 130 formed to have divisions separated from each other in a region crossing the Rx electrode unit 120, a first insulating unit 140 formed to cover the Rx electrode unit 120 and the Tx electrode unit 130 and configured to insulate the Rx electrode unit 120 and the Tx electrode unit 130, and a bridge pattern unit 150 formed with first through-holes 144 formed in the first insulating unit 140, formed on the first insulating unit 140 between the first through-holes 144, and configured to connect the divisions of the Tx electrode unit 130, which have been separated from each other in the crossing region. Also, in this example, an antenna may include a signal transmission line unit (not shown) and a signal radiation pattern unit 210 formed on the Tx electrode unit 130 or the Rx electrode unit 120 via the first insulating unit 140.

According to an example disclosed in FIG. 6, the signal transmission line unit and the signal radiation pattern unit 210 included in the antenna may be coplanar with each other. Accordingly, as an example disclosed in FIG. 7, which will be described below, there is no need to form second through-holes 244 in a second insulating unit 220, and also the number of stack-ups is decreased.

As still another example, as disclosed in FIG. 7, a sensing electrode unit 110 included in a touch sensor unit 10 may include an Rx electrode unit 120 formed on a substrate 100 to extend in one direction, a Tx electrode unit 130 formed to have divisions separated from each other in a region crossing the Rx electrode unit 120, a first insulating unit 140 formed to cover the Rx electrode unit 120 and the Tx electrode unit 130 and configured to insulate the Rx electrode unit 120 and the Tx electrode unit 130, and a bridge pattern unit 150 formed with first through-holes 144 formed in the first insulating unit 140, formed on the first insulating unit 140 between the first through-holes 144, and configured to connect the divisions of the Tx electrode unit 130, which have been separated from each other in the crossing region. Also, in this example, an antenna unit 20 may include a signal radiation pattern unit 210 formed on the Tx electrode unit 130 or the Rx electrode unit 120 via the first insulating unit 140, a second insulating unit 220 formed to cover the signal radiation pattern unit 210 and the bridge pattern unit 150 and configured to insulate the signal radiation pattern unit 210 and the bridge pattern unit 150, and a signal transmission line unit 230 formed with second through-holes 244 formed in the second insulating unit 220, formed on the second insulating unit 220 between the second through-holes 244, and configured to connect the signal radiation pattern unit 210. A protective unit 30 is formed to cover the signal transmission line unit 230 and the second insulating unit 220 to protect the antenna unit 20.

According to an example disclosed in FIG. 7, the signal transmission line unit 230 and the signal radiation pattern unit 210 included in the antenna unit 20 may be made not of the same material but of different materials, and the signal transmission line unit 230 may be formed without regard to the bridge pattern unit 150, thus increasing the degree of freedom of the signal transmission line unit 230.

As still another example, as disclosed in FIG. 8, a sensing electrode unit 110 included in a touch sensor unit 10 may include an Rx electrode unit 120 formed on a substrate 100 to extend in one direction, a Tx electrode unit 130 formed to have divisions separated from each other in a region crossing the Rx electrode unit 120, a first insulating unit 140 formed to cover the Rx electrode unit 120 and the Tx electrode unit 130 and configured to insulate the Rx electrode unit 120 and the Tx electrode unit 130, and a bridge pattern unit 150 formed with first through-holes 144 formed in the first insulating unit 140, formed on the first insulating unit 140 between the first through-holes 144, and configured to connect the divisions of the Tx electrode unit 130, which have been separated from each other in the crossing region. Also, in this example, an antenna may include a third insulating unit 225 formed on the sensing electrode unit 110, and a signal transmission line unit (not shown) and a signal radiation pattern unit 210 formed on the Tx electrode unit 130 or the Rx electrode unit 120 via the first insulating unit 140 and the third insulating unit 225.

According to the example disclosed in FIG. 8, unlike the examples disclosed in FIGS. 6 and 7, the antenna is formed not coplanar with the bridge pattern unit 150 of the touch sensor unit 10 but on the third insulating unit 225 formed on the touch sensor unit 10. According to the example disclosed in FIG. 8, similar to the example disclosed in FIG. 7, the degree of freedom of the signal transmission line unit included in the antenna is increased.

For example, the antenna unit 20 may be bonded to the touch sensor unit 10 via a bonding agent.

Also, for example, the antenna unit 20 may have a mesh structure.

The elements of the touch sensor unit 10 and the antenna unit 20 included in the antenna-equipped touch sensor according to an embodiment of the present invention will be described as follows.

The touch sensor unit 10 may include a substrate 100 and a sensing electrode unit 110.

The substrate 100 may structurally support the antenna-equipped touch sensor according to an embodiment of the present invention and may be formed of various well-known materials that are rigid or flexible.

The sensing electrode unit 110 may sense a touch signal from a user or the like and may include an Rx electrode unit 120, a Tx electrode unit 130, a first insulating unit 140, and a bridge pattern unit 150.

The Rx electrode unit 120 may be formed in a first direction while being electrically connected, that is, in an extending state, and the Tx electrode unit 130 may be formed in a second direction while being electrically separated. Here, the second direction crosses the first direction. For example, the first direction may be an X-axis direction, and the second direction may be a Y-axis direction.

For example, the Rx electrode unit 120 and the Tx electrode unit 130 included in the sensing electrode unit 110 may independently have polygonal (triangular, tetragonal, pentagonal, hexagonal, heptagonal, or more) patterns.

Also, for example, the Rx electrode unit 120 and the Tx electrode unit 130 included in the sensing electrode unit 110 may include regular patterns. A regular pattern means that the pattern has a regular form. For example, the sensing patterns may independently include a mesh pattern such as a rectangle or a square or a pattern such as a hexagon.

Also, for example, the Rx electrode unit 120 and the Tx electrode unit 130 included in the sensing electrode unit 110 may include irregular patterns. An irregular pattern means that the pattern does not have a regular form.

Also, for example, when the Rx electrode unit 120 and the Tx electrode unit 130 included in the sensing electrode unit 110 are formed of a material such as metal nanowires, carbon-based materials, polymer materials, or the like, the Rx electrode unit 120 and the Tx electrode unit 130 may have a mesh structure. When the Rx electrode unit 120 and the Tx electrode unit 130 have a mesh structure, signals are sequentially transferred to patterns that are in contact with one another and adjacent to one other, and thus it is possible to realize a pattern having high sensitivity.

For example, the Rx electrode unit 120 and the Tx electrode unit 130 included in the sensing electrode unit 110 may be formed in a single layer or in a plurality of layers.

As the material of the first insulating unit 140 configured to insulate the Rx electrode unit 120 and the Tx electrode unit 130, an insulating material known in the art may be used without limitation. For example, a thermosetting resin composition or a photosensitive resin composition including acrylic resins or metal oxides such as a silicon oxide may be used. Alternatively, the first insulating unit 140 may be formed using an inorganic material such as a silicon oxide (SiOx). In this case, deposition, sputtering, or the like may be used for the formation.

The bridge pattern unit 150 may electrically connect the divisions of the Tx electrode unit 130, which have been separated from each other in a crossing region where the Rx electrode unit 120 crosses the Tx electrode unit 130.

Table 1 below shows experimental data on the mutual capacitance of the touch sensor according to a location where the antenna unit 20 is mounted.

In this experiment, a reference example indicates a case in which the antenna unit 20 is not mounted on the touch sensor unit 10. Embodiment 1 indicates a case in which the antenna unit 20 is mounted on the Rx electrode unit 120 of the sensing electrode unit 110 included in the touch sensor unit 10, Embodiment 2 indicates a case in which the antenna unit 20 is mounted on the Tx electrode unit 130 of the sensing electrode unit 110 included in the touch sensor unit 10, and Embodiment 3 indicates a case in which the antenna unit 20 is mounted in a state of overlapping with the Rx electrode unit 120 and the Tx electrode unit 130. That is, Embodiment 3 indicates a case in which the antenna unit 20 is spread over the Rx electrode unit 120 and the Tx electrode unit 130.

TABLE 1

| Items | Base Mutual Capacitance (Base Cm) | Delta Mutual Capacitance (Delta Cm) | Delta Mutual Capacitance Ratio (Delta Cm ratio, %) |
| --- | --- | --- | --- |
| Reference Example | 0.56418 | 0.30430 | 53.94 |
| Embodiment 1 | 0.55143 | 0.27816 | 50.44 |
| Embodiment 2 | 0.55347 | 0.30361 | 54.86 |
| Embodiment 3 | 0.53737 | 0.34515 | 64.23 |

Since the reference example indicates the case in which the antenna unit 20 is not mounted on the touch sensor unit 10, noise due to interference between a touch sensor signal and an antenna transmission/reception signal is not generated. Accordingly, it can be seen that the touch sensor has smaller noise due to the antenna and thus is more excellent when the difference from the delta mutual-capacitance ratio according to the reference example is smaller. In addition, the touch sensor becomes sensitive to noise as the delta mutual-capacitance ratio increases. In other words, as the delta mutual-capacitance ratio becomes greater in the embodiment than in the reference example, the touch sensor of the embodiment becomes sensitive to noise.

According to the experimental data disclosed in Table 1, it can be seen that Embodiment 2, which is the case in which the antenna unit 20 is mounted on the Tx electrode unit 130, exhibits the best performance. Also, it can be seen that Embodiment 1, which is the case in which the antenna unit 20 is mounted on the Rx electrode unit 120, exhibits relatively stronger noise than Embodiment 2 but exhibits—relatively more excellent characteristics than Embodiment 3.

As described above in detail, according to the present invention, it is possible to provide an antenna-equipped touch sensor capable of minimizing noise due to interference between a touch sensor signal and an antenna transmission/reception signal even when an antenna is mounted in a display region where the touch sensor is installed.

DESCRIPTION OF REFERENCE NUMERALS

10: Touch sensor unit
20: Antenna unit
30: Protective unit
100: Substrate
110: Sensing electrode unit
120: Rx electrode unit
130: Tx electrode unit
140: First insulating unit
150: Bridge pattern unit
144: First through-hole
210: Signal radiation pattern unit
220: Second insulating unit
225: Third insulating unit
230: Signal transmission line unit
244: Second through-hole

What is claimed is:

1. An antenna-equipped touch sensor comprising:
a touch sensor unit including a sensing electrode unit; and
an antenna unit formed on the touch sensor unit,
wherein the antenna unit is formed on the sensing electrode unit included in the touch sensor unit while being insulated from the sensing electrode unit,
wherein the sensing electrode unit comprises a transmitting (Tx) electrode unit and a receiving (Rx) electrode unit that are formed to cross each other while being insulated from each other.

2. The antenna-equipped touch sensor of claim 1, wherein the antenna unit comprises a signal radiation pattern unit and a signal transmission line unit.

3. The antenna-equipped touch sensor of claim 2, wherein the signal radiation pattern unit is located in a region defined by a unit electrode pattern included in the sensing electrode unit.

4. The antenna-equipped touch sensor of claim 1, wherein the antenna unit is formed on the Tx electrode unit or the Rx electrode unit while being insulated from the Tx electrode unit and the Rx electrode unit.

5. The antenna-equipped touch sensor of claim 1, wherein,
the sensing electrode unit further comprises:
a first insulating unit configured to insulate the Rx electrode unit and the Tx electrode unit; and
a bridge pattern unit configured to connect divisions of the Tx electrode unit, which have been separated from each other in the crossing region, and
the antenna unit is formed on the Tx electrode unit or the Rx electrode unit while being insulated by the first insulating unit.

6. The antenna-equipped touch sensor of claim 5, wherein,
the bridge pattern unit is formed with first through-holes formed in the first insulating unit, formed on the first insulating unit, and configured to connect, through the first through-holes, the divisions of the Tx electrode unit, which have been separated from each other in the crossing region, and
the antenna unit is formed on the Tx electrode unit or the Rx electrode unit via the first insulating unit.

7. The antenna-equipped touch sensor of claim 1, wherein the antenna unit has a mesh structure or a front metal thin-film structure.

8. The antenna-equipped touch sensor of claim 1, wherein the antenna unit contains a conductive oxide.

9. The antenna-equipped touch sensor of claim 1, wherein the antenna unit is bonded to the touch sensor unit.

10. The antenna-equipped touch sensor of claim 1, wherein,
the sensing electrode unit more comprises:
a first insulating unit formed to cover the Rx electrode unit and the Tx electrode unit and configured to insulate the Rx electrode unit and the Tx electrode unit; and
a bridge pattern unit formed with first through-holes formed in the first insulating unit, formed on the first insulating unit between the first through-holes, and configured to connect, through the first through-holes, the divisions of the Tx electrode unit separated from each other in the crossing region,
wherein the Rx electrode unit is formed on a substrate to extend in one direction, wherein the Tx electrode unit is formed to have divisions separated from each other in a region crossing the Rx electrode unit, and wherein the antenna unit is bonded to the touch sensor unit.

11. The antenna-equipped touch sensor of claim 1, wherein, the sensing electrode unit more comprises:
- a first insulating unit formed to cover the Rx electrode unit and the Tx electrode unit and configured to insulate the Rx electrode unit and the Tx electrode unit; and
- a bridge pattern unit formed with first through-holes formed in the first insulating unit, formed on the first insulating unit between the first through-holes, and configured to connect, through the first through-holes, the divisions of the Tx electrode unit separated from each other in the crossing region, wherein the Rx electrode unit is formed on a substrate to extend in one direction, wherein the Tx electrode unit is formed to have divisions separated from each other in a region crossing the Rx electrode unit, and wherein the antenna unit comprises:
- a signal radiation pattern unit formed on the Tx electrode unit or the Rx electrode unit via the first insulating unit;
- a second insulating unit formed to cover the signal radiation pattern unit and the bridge pattern unit and configured to insulate the signal radiation pattern unit and the bridge pattern unit; and
- a signal transmission line unit formed with second through-holes formed in the second insulating unit, formed on the second insulating unit between the second through-holes, and configured to connect the signal radiation pattern unit.

12. The antenna-equipped touch sensor of claim 11, further comprising a protective unit formed to cover the signal transmission line unit and the second insulating unit.

13. The antenna-equipped touch sensor of claim 1, wherein, the sensing electrode unit more comprises:
- a first insulating unit formed to cover the Rx electrode unit and the Tx electrode unit and configured to insulate the Rx electrode unit and the Tx electrode unit; and
- a bridge pattern unit formed with first through-holes formed in the first insulating unit, formed on the first insulating unit, and configured to connect, through the first through-holes, the divisions of the Tx electrode unit separated from each other in the crossing region, wherein the Rx electrode unit is formed on a substrate to extend in one direction, wherein the Tx electrode unit is formed to have divisions separated from each other in a region crossing the Rx electrode unit, wherein the antenna unit is formed on the Tx electrode unit or the Rx electrode unit via a third insulating unit formed on the sensing electrode unit.

* * * * *